United States Patent
Su et al.

(10) Patent No.: US 11,124,642 B1
(45) Date of Patent: Sep. 21, 2021

(54) ETHYLENE-VINYL ALCOHOL COPOLYMER COMPOSITION WITH IMPROVED OXYGEN BARRIER PROPERTIES

(71) Applicant: Chang Chun Petrochemical Co., Ltd., Taipei (TW)

(72) Inventors: Shih Yuan Su, Taipei (TW); Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/205,324

(22) Filed: Mar. 18, 2021

(51) Int. Cl.
*C08L 29/04* (2006.01)
*C08K 3/08* (2006.01)
*C08K 5/05* (2006.01)

(52) U.S. Cl.
CPC .............. *C08L 29/04* (2013.01); *C08K 3/08* (2013.01); *C08K 5/05* (2013.01); *C08K 2003/0818* (2013.01); *C08L 2201/14* (2013.01); *C08L 2203/02* (2013.01); *C08L 2203/20* (2013.01)

(58) Field of Classification Search
CPC ....... C08L 23/0846–0861; C08L 23/26; C08L 29/04; C08L 43/00; C08L 3/11; C08K 3/08; C08K 3/0818
See application file for complete search history.

(56) References Cited

U.S. PATENT DOCUMENTS

| | | | |
|---|---|---|---|
| 2002/0055572 A1* | 5/2002 | Tai | B32B 27/08 524/413 |
| 2005/0228129 A1 | 10/2005 | Tsai et al. | |
| 2010/0317514 A1* | 12/2010 | Ohta | C08L 29/02 502/402 |
| 2017/0267851 A1 | 9/2017 | Yamakoshi et al. | |
| 2018/0264787 A1 | 9/2018 | Hausmann et al. | |
| 2020/0010591 A1 | 1/2020 | Chang et al. | |
| 2020/0079940 A1 | 3/2020 | Usui et al. | |
| 2020/0087504 A1 | 3/2020 | Usui et al. | |

\* cited by examiner

*Primary Examiner* — Ana L. Woodward
(74) *Attorney, Agent, or Firm* — Polsinelli PC

(57) ABSTRACT

Provided is an ethylene-vinyl alcohol copolymer composition having improved oxygen barrier properties, wherein the ethylene-vinyl alcohol copolymer composition comprises an ethylene-vinyl alcohol copolymer; and a manganese content of about 0.01 ppm to 0.49 ppm.

15 Claims, No Drawings

ETHYLENE-VINYL ALCOHOL COPOLYMER COMPOSITION WITH IMPROVED OXYGEN BARRIER PROPERTIES

FIELD OF THE DISCLOSURE

The instant disclosure relates to ethylene-vinyl alcohol copolymer composition and pellets thereof having improved oxygen barrier properties.

BACKGROUND OF THE DISCLOSURE

EVOH copolymer are widely used in laminates for preserving perishable items. For example, EVOH copolymer and laminates are commonly used by the food packaging industry, medical device and supplies industry, pharmaceutical industry, electronics industry, and agricultural chemicals industry. EVOH copolymer are often incorporated as a distinct layer within a laminate to serve as an oxygen-barrier layer.

EVOH copolymer having a lower ethylene content usually provide a better degree of crystallization and better gas-barrier properties, but typically provide inferior mechanical properties. Conversely, EVOH copolymer having a higher ethylene content usually provide better mechanical properties, but provide inferior gas-barrier properties. Additionally, EVOH copolymer traditionally have the problem of controlling the amount gelation during extrusion. Large amounts of gelation or number of gel spots may cause adversely affect films formed from such EVOH copolymer.

Besides, there is also a continued need for EVOH copolymer composition that provide better oxygen-barrier properties.

SUMMARY OF THE DISCLOSURE

Aspects of the instant disclosure relate to an ethylene-vinyl alcohol ("EVOH") copolymer composition and pellets thereof having improved oxygen barrier properties. The inventors recognized that controlling the manganese content in the EVOH copolymer composition may enhance the gas barrier properties and the gel behavior of the EVOH copolymer composition. It is believed that controlling the amount of manganese in the EVOH copolymer composition may enhance the interactions between the EVOH copolymers to improve the gas barrier properties of films formed therefrom. Without being limited to any particular theory, certain manganese contents in the EVOH copolymer composition may increase the number of OH groups in the EVOH cross link chain, strengthen the ionic bonds between EVOH copolymer, and/or strengthen the hydrogen bonding between EVOH copolymer.

An EVOH copolymer composition according to an aspect of the disclosure typically includes an EVOH copolymer and a manganese content of about 0.01 ppm to 0.49 ppm. The EVOH copolymer may have an ethylene content of about 24 mole % to about 48 mole %. For example, the EVOH copolymer may have an ethylene content of about 24 mole % to about 35 mole % or about 36 mole % to about 48 mole %. In some instances, the EVOH copolymer may have an ethylene content of about 24 mole % to about 35 mole %, and a solution comprising 2.5 g of the EVOH copolymer composition dissolved in 84 g of an aqueous methanol solution of 60 wt. % methanol has a pH of 5.1 to 7.2, preferably 5.3 to 6.9. In other instances, the EVOH copolymer may have an ethylene content of about 36 mole % to about 48 mole %, and a solution comprising 2.5 g of the EVOH copolymer composition dissolved in 84 g of an aqueous methanol solution of 80 wt. % methanol has a pH of 5.1 to 7.2, preferably 5.3 to 6.9.

The EVOH copolymer composition may comprise a boron content of about 50 ppm to 300 ppm. Additionally or alternatively, the EVOH copolymer composition may comprise an alkali metal content of about 50 ppm to 400 ppm. In at some cases, the manganese content of EVOH copolymer composition is about 0.01 ppm to 0.38 ppm.

Preferably, the EVOH copolymer has a degree of saponification of 99.5 mole % or more. In at least one instance, the hygroscopicity of EVOH copolymer composition is less than 1%. The EVOH copolymer composition may comprise an EVOH copolymer with a melting point temperature of 150° C. to 200° C.

According to another aspect of the disclosure, the EVOH copolymer composition typically includes:

(a) an ethylene-vinyl alcohol copolymer having an ethylene content of about 24 mole % to about 48 mole %, and a degree of saponification of 99.5 mole % or more;
(b) a manganese content of about 0.01 ppm to 0.49 ppm;
(c) a boron content of about 50 ppm to 300 ppm; and
(d) an alkali metal content of about 50 ppm to 400 ppm.

DETAILED DESCRIPTION OF THE DISCLOSURE

Aspects of the instant disclosure relate to an ethylene-vinyl alcohol ("EVOH") copolymer compositions and pellets thereof having improved oxygen barrier properties. According to an aspect of the disclosure, the EVOH copolymer compositions typically include an ethylene-vinyl alcohol copolymer and a manganese content of about 0.01 ppm to 0.49 ppm.

The EVOH copolymer composition may have an EVOH copolymer with an ethylene content of about 24 mole % to about 48 mole %. The EVOH copolymer composition may have more than one EVOH copolymer, such as two or more, three or more, four or more, five or more, or six or more EVOH copolymers. The ethylene content of the EVOH copolymer(s) may be about 24 mole % to about 35 mole %. For instance, the ethylene content of the one or more EVOH copolymer(s) may be about 24 mole % to about 35 mole %, about 25 mole % to about 35 mole %, about 27 mole % to about 35 mole %, about 29 mole % to about 35 mole %; about 24 mole % to about 33 mole %, about 25 mole % to about 33 mole %, about 27 mole % to about 33 mole %, about 29 mole % to about 33 mole %; about 24 mole % to about 32 mole %, about 25 mole % to about 32 mole %, about 27 mole % to about 32 mole %, or about 29 mole % to about 32 mole %, including any ranges or subranges therebetween. In further embodiments, the ethylene content of the one or more EVOH copolymer(s) is about 36 mole % to about 48 mole %. In some instances, the ethylene content of the EVOH copolymer may be about 36 mole % to about 48 mole %, about 37 mole % to about 48 mole %, about 38 mole % to about 48 mole %; about 36 mole % to about 46 mole %, about 37 mole % to about 46 mole %, about 38 mole % to about 46 mole %; about 36 mole % to about 44 mole %, about 37 mole % to about 44 mole %, about 38 mole % to about 44 mole %, including any ranges or subranges therebetween.

The one or more EVOH copolymer(s) may have a degree of saponification of about 90 mole % or more. In some cases, the degree of saponification of the EVOH copolymer(s) may be about 90.5 mole % or more, about 91 mole % or more, about 91.5 mole % or more, about 92 mole % or more, about 92.5 mole % or more, about 93 mole % or more, about 93.5 mole % or more, about 94 mole % or more, about 94.5 mole % or more, about 95 mole % or more, about 95.5 mole % or more, about 96 mole % or more, about 96.5 mole % or more, about 97 mole % or more, about 97.5 mole % or more, about 98 mole % or more, about 99 mole % or more, about 99.5 mole % or more, about 99.6 mole % or more, about 99.7 mole % or more, about 99.8 mole % or more, about 99.9 mole % or more, or any ranges therebetween. Preferably, the EVOH copolymer(s) has a degree of saponification of at least 99.5 mole %.

The EVOH copolymer compositions typically have a manganese content of about 0.01 ppm to 0.49 ppm. The manganese content of the EVOH copolymer composition may be, in some cases, about 0.01 ppm to 0.49 ppm, about 0.01 ppm to about 0.45 ppm, about 0.01 ppm to about 0.40 ppm, about 0.01 ppm to about 0.35 ppm, about 0.01 ppm to about 0.3 ppm, about 0.01 ppm to about 0.27 ppm, about 0.01 ppm to about 0.25 ppm, about 0.01 ppm to about 0.22 ppm, about 0.01 ppm to about 0.2 ppm, about 0.01 ppm to about 0.18 ppm, about 0.01 ppm to about 0.16 ppm, about 0.01 ppm to about 0.14 ppm, about 0.01 ppm to about 0.12 ppm, about 0.01 ppm to about 0.1 ppm; about 0.05 ppm to about 0.49 ppm, about 0.05 ppm to about 0.45 ppm, about 0.05 ppm to about 0.4 ppm, about 0.05 ppm to about 0.35 ppm, about 0.05 ppm to about 0.30 ppm, about 0.05 ppm to about 0.27 ppm, about 0.05 ppm to about 0.25 ppm, about 0.05 ppm to about 0.22 ppm, about 0.05 ppm to about 0.2 ppm, about 0.05 ppm to about 0.18 ppm, about 0.05 ppm to about 0.16 ppm, about 0.05 ppm to about 0.14 ppm, about 0.05 ppm to about 0.12 ppm, about 0.05 ppm to about 0.1 ppm; about 0.1 ppm to about 0.49 ppm, about 0.1 ppm to about 0.45 ppm, about 0.1 ppm to about 0.4 ppm, about 0.01 ppm to about 0.38 ppm about 0.1 ppm to about 0.35 ppm, about 0.1 ppm to about 0.3 ppm, about 0.1 ppm to about 0.27 ppm, about 0.1 ppm to about 0.25 ppm, about 0.1 ppm to about 0.22 ppm, about 0.1 ppm to about 0.2 ppm, about 0.1 ppm to about 0.18 ppm, about 0.1 ppm to about 0.16 ppm, about 0.1 ppm to about 0.14 ppm; about 0.15 ppm to about 0.49 ppm, about 0.15 ppm to about 0.45 ppm, about 0.15 ppm to about 0.4 ppm, about 0.15 ppm to about 0.35 ppm, about 0.15 ppm to about 0.3 ppm, about 0.15 ppm to about 0.27 ppm, about 0.15 ppm to about 0.25 ppm, about 0.15 ppm to about 0.22 ppm, about 0.15 ppm to about 0.2 ppm; about 0.2 ppm to about 0.49 ppm, about 0.2 ppm to about 0.45 ppm, about 0.2 ppm to about 0.4 ppm, about 0.2 ppm to about 0.35 ppm, about 0.2 ppm to about 0.3 ppm, about 0.2 ppm to about 0.27 ppm, about 0.2 ppm to about 0.25 ppm; about 0.25 ppm to about 0.49 ppm, about 0.25 ppm to about 0.45 ppm, about 0.25 ppm to about 0.4 ppm, about 0.25 ppm to about 0.35 ppm, about 0.25 ppm to about 0.3 ppm, or any ranges or subranges therebetween, based on the total weight of the EVOH copolymer composition. In at least one embodiment, the manganese content of the EVOH copolymer composition is about 0.01 ppm to about 0.38 ppm.

In some instances, the EVOH copolymer composition may have a boron content of about 30 ppm to about 300 ppm, about 30 ppm to about 275 ppm, about 30 ppm to about 250 ppm, about 30 ppm to about 225 ppm, about 30 ppm to about 200 ppm, about 30 ppm to about 175 ppm; about 50 ppm to about 300 ppm, about 50 ppm to about 275 ppm, about 50 ppm to about 250 ppm, about 50 ppm to about 225 ppm, about 50 ppm to about 200 ppm, about 50 ppm to about 175 ppm; about 70 ppm to about 300 ppm, about 70 ppm to about 275 ppm, about 70 ppm to about 250 ppm, about 70 ppm to about 225 ppm, about 70 ppm to about 200 ppm, about 70 ppm to about 175 ppm; about 90 ppm to about 300 ppm, about 90 ppm to about 275 ppm, about 90 ppm to about 250 ppm, about 90 ppm to about 225 ppm, about 90 ppm to about 200 ppm, about 90 ppm to about 175 ppm; about 110 ppm to about 300 ppm, about 110 ppm to about 275 ppm, about 110 ppm to about 250 ppm, about 110 ppm to about 225 ppm, about 110 ppm to about 200 ppm, about 110 ppm to about 175 ppm; about 130 ppm to about 300 ppm, about 130 ppm to about 275 ppm, about 130 ppm to about 250 ppm, about 130 ppm to about 225 ppm, about 130 ppm to about 200 ppm, about 130 ppm to about 175 ppm, or any ranges or subranges therebetween, based on the total weight of the EVOH copolymer composition.

Additionally or alternatively, the EVOH copolymer composition may have an alkali metal content of about 50 ppm to about 400 ppm, about 50 ppm to about 350 ppm, about 50 ppm to about 300 ppm, about 50 ppm to about 275 ppm, about 50 ppm to about 250 ppm, about 50 ppm to about 225 ppm, about 50 ppm to about 200 ppm, about 50 ppm to about 175 ppm; about 75 ppm to about 400 ppm, about 75 ppm to about 350 ppm, about 75 ppm to about 300 ppm, about 75 ppm to about 275 ppm, about 75 ppm to about 250 ppm, about 75 ppm to about 225 ppm, about 75 ppm to about 200 ppm, about 75 ppm to about 175 ppm; about 100 ppm to about 400 ppm, about 100 ppm to about 350 ppm, about 100 ppm to about 300 ppm, about 100 ppm to about 275 ppm, about 100 ppm to about 250 ppm, about 100 ppm to about 225 ppm, about 100 ppm to about 200 ppm, about 100 ppm to about 175 ppm; about 125 ppm to about 400 ppm, about 125 ppm to about 350 ppm, about 125 ppm to about 300 ppm, about 125 ppm to about 275 ppm, about 125 ppm to about 250 ppm, about 125 ppm to about 225 ppm, about 125 ppm to about 200 ppm, about 125 ppm to about 175 ppm; about 140 ppm to about 400 ppm, about 140 ppm to about 350 ppm, about 140 ppm to about 300 ppm, about 140 ppm to about 275 ppm, about 140 ppm to about 250 ppm, about 140 ppm to about 225 ppm, about 140 ppm to about 200 ppm; about 160 ppm to about 400 ppm, about 160 ppm to about 350 ppm, about 160 ppm to about 300 ppm, about 160 ppm to about 275 ppm, about 160 ppm to about 250 ppm, about 160 ppm to about 225 ppm, or any ranges or subranges therebetween, based on the total weight of the EVOH copolymer composition.

The EVOH copolymer composition may, preferably, have a pH value of about 5.1 to about 7.2 when dissolved in an aqueous methanol solution. The solubility of the EVOH copolymer composition in the aqueous methanol solution depends, at least in part, on the ethylene content of the EVOH copolymer(s) within the EVOH copolymer composition. In some cases, the EVOH copolymer has an ethylene content of about 24 mole % to about 35 mole %, and a solution comprising 2.5 g of the EVOH copolymer composition dissolved in 84 g of an aqueous methanol solution of 60 wt. % methanol has a pH of about 5.1 to about 7.2. Preferably, the pH of a solution comprising 2.5 g of the EVOH copolymer composition having an EVOH copolymer with an ethylene content of about 24 mole % to about 35 mole % when dissolved in 84 g of an aqueous methanol solution of 60 wt. % methanol is about 5.1 to about 7.2, about 5.1 to about 7.1, about 5.1 to about 7, about 5.1 to about 6.9, about 5.1 to about 6.8, about 5.1 to about 6.7; about 5.3 to about 7.2, about 5.3 to about 7.1, about 5.3 to about 7, about 5.3 to about 6.9, about 5.3 to about 6.8, about 5.3 to about 6.7; about 5.6 to about 7.2, about 5.6 to about 7.1, about 5.6 to about 7, about 5.6 to about 6.9, about 5.6 to about 6.8, about 5.6 to about 6.7; about 5.9 to about 7.2, about 5.9 to about 7.1, about 5.9 to about 7, about 5.9 to about 6.9, about 5.9 to about 6.8, or about 5.9 to about 6.7, including ranges and subranges thereof.

In other cases, the EVOH copolymer may have an ethylene content of about 36 mole % to about 48 mole %, a solution comprising 2.5 g of the EVOH copolymer composition dissolved in 84 g of an aqueous methanol solution of 80 wt. % methanol has a pH of about 5.1 to about 7.2. Preferably, the pH of a solution comprising 2.5 g of the EVOH copolymer composition having an EVOH copolymer with an ethylene content of about 36 mole % to about 48 mole % when dissolved in 84 g of an aqueous methanol solution of 80 wt. % is about 5.1 to about 7.2, about 5.1 to about 7.1, about 5.1 to about 7, about 5.1 to about 6.9, about 5.1 to about 6.8, about 5.1 to about 6.7; about 5.3 to about 7.2, about 5.3 to about 7.1, about 5.3 to about 7, about 5.3 to about 6.9, about 5.3 to about 6.8, about 5.3 to about 6.7; about 5.6 to about 7.2, about 5.6 to about 7.1, about 5.6 to about 7, about 5.6 to about 6.9, about 5.6 to about 6.8, about 5.6 to about 6.7; about 5.9 to about 7.2, about 5.9 to about 7.1, about 5.9 to about 7, about 5.9 to about 6.9, about 5.9 to about 6.8, or about 5.9 to about 6.7, including ranges and subranges thereof.

The EVOH copolymer composition may, additionally or alternatively, have a hygroscopicity of less than about 1 wt. %, based on the total weight of the EVOH copolymer composition, e.g., in the form of a pellet. For example, the EVOH copolymer composition may have a hygroscopicity of about 0.9 wt. % or less, about 0.8 wt. % or less, about 0.7 wt. % or less about 0.6 wt. % or less, about 0.5 wt. % or less, about 0.4 wt. % or less, about 0.3 wt. % or less, about 0.2 wt. % or less, or about 0.1 wt. % or less, based on the total weight of the EVOH copolymer composition.

In some cases, the melting point temperature of the EVOH copolymer of the EVOH copolymer composition is from 150° C. to 200° C. For example, one or more EVOH copolymer(s) of the EVOH copolymer composition may have a melting point temperature of about 150° C. to about 200° C., about 150° C. to about 195° C., about 150° C. to about 190° C., about 150° C. to about 185° C., about 150° C. to about 180° C., about 150° C. to about 175° C., about 150° C. to about 170° C.; about 155° C. to about 200° C., about 155° C. to about 195° C., about 155° C. to about 190° C., about 155° C. to about 185° C., about 155° C. to about 180° C., about 155° C. to about 175° C., about 155° C. to about 170° C.; about 160° C. to about 200° C., about 160° C. to about 195° C., about 160° C. to about 190° C., about 160° C. to about 185° C., about 160° C. to about 180° C., about 160° C. to about 175° C.; about 165° C. to about 200° C., about 165° C. to about 195° C., about 165° C. to about 190° C., about 165° C. to about 185° C., about 165° C. to about 180° C.; about 170° C. to about 200° C., about 170° C. to about 195° C., about 170° C. to about 190° C., or about 170° C. to about 185° C., including any ranges or subranges therebetween.

The EVOH copolymer compositions of the instant disclosure may be produced by various methods, including methods known by individuals of ordinary skill in the art. In addition, the EVOH copolymer compositions may be produced according to the following non-limiting examples of methods for producing EVOH copolymer compositions in accordance with the instant disclosure.

According to a non-limiting embodiment, provided is a method for producing a EVOH copolymer composition that comprises: (a) producing an EVOH copolymer; (b) forming EVOH particles from the EVOH copolymer; (c) dipping and/or washing the EVOH particles in a first solution, the first solution being in contact with a first steel; (d) removing the EVOH particles from the first solution; (e) dipping and/or washing the EVOH particles in a second solution, the second solution being in contact with a second steel; (f) removing the EVOH particles from the second solution; (g) dipping and/or washing the EVOH particles in a third solution having a pH of 7.7 or less to obtain final EVOH particles having the EVOH copolymer composition and/or final EVOH pellets therefrom, the third solution containing boron and being in contact with a third steel. Preferably, one of the first solution or the second solution has a pH of 3.4 to 3.8, and the other of the first solution or the second solution has a pH of 10.8 to 11.5.

One of ordinary skill would readily understand how to produce ordinary EVOH copolymers, compositions thereof, and pellets thereof based on knowledge of the art and U.S. patent application Ser. No. 16/729,984, which is incorporated herein by reference in their entireties for all purposes.

The EVOH copolymer may be dipped or washed in a first solution by any suitable means known in the art. The first solution is typically in contact with a first steel. For example, the first steel may be in the form of a container containing the first solution, such that the EVOH copolymer may be dipped or washed with the first solution in the first steel container. The EVOH copolymer may remain in the first solution for about 64 minutes to about 144 minutes, such as for about 70 minutes to about 140 minutes, about 80 minutes to about 135 minutes, about 90 minutes to about 130 minutes, about 90 minutes to about 125 minutes, about 100 minutes to about 125 minutes, about 110 minutes to about 125 minutes, about 115 minutes to about 125 minutes, or any ranges therebetween. The EVOH copolymer is removed from the first solution after remaining in the first solution for the desired amount of time.

The EVOH copolymer is typically dipped or washed in a second solution, wherein the second solution is in contact with a second steel. Similar to the first steel, the second steel may be in the form of a steel container. For instance, the EVOH copolymer may be dipped or washed with the second solution in the second steel container. The EVOH copolymer may remain in the second solution for about 80 minutes to about 144 minutes, such as for about 85 minutes to about 140 minutes, about 90 minutes to about 135 minutes, about 95 minutes to about 130 minutes, about 100 minutes to about 125 minutes, about 105 minutes to about 125 minutes, about 110 minutes to about 125 minutes, about 115 minutes to about 125 minutes, or any ranges therebetween. The EVOH copolymer is removed from the second solution after remaining in the second solution for the desired amount of time.

Typically, one of the first solution or the second solution has a pH of 3.4 to 3.8 and the other of the first solution or the second solution has a pH of 10.8 to 11.5. In some cases, one of the first solution or the second solution has a pH of 3.4 to 3.8, 3.42 to 3.7, 3.44 to 3.6, or any ranges therebetween. The other of the first solution or the second solution may have a pH of 10.8 to 11.5, 10.85 to 11.4, 10.85 to 11.3, 10.85 to 11.2, 10.85 to 11.1, or any ranges therebetween.

The EVOH copolymer may be dipped or washed in a third solution containing boron and having a pH of 7.7 or less, where the third solution in contact with a third steel. The third steel is preferably in the form of a steel container, such that the EVOH copolymer may be dipped or washed with the third solution in the third steel container. Preferably, the pH of the third solution is 3.3 to 7.7. For example, the pH of the third solution may be 3.3 to 7.7, 3.3 to 7.6, 3.3 to 7.5, 3.3 to 7.4, 3.3 to 7.3, 3.3 to 7.2, 3.3 to 7.1 or any range therebetween. The EVOH copolymer may remain in the third solution for about 430 minutes to about 720 minutes. In some cases, the EVOH copolymer remains in the third solution for about 430 minutes to about 720 minutes, about 460 minutes to about 700 minutes, about 490 minutes to about 680 minutes, about 520 minutes to about 660 minutes, about 550 minutes to about 640 minutes, about 570 minutes to about 630 minutes, about 580 minutes to about 620 minutes, about 590 minutes to about 610 minutes, or any ranges therebetween. The EVOH copolymer is removed from the third solution, after remaining in the third solution for the desired amount of time.

The first, second, and/or third steels typically contain an amount of manganese so as to have a manganese content. In some cases, one or more of the first, second, and third steels comprises about 1 wt. % to about 3 wt. % manganese, about 5 wt. % to about 11 wt. % nickel, about 13 wt. % to about 23 wt. % chromium, or a combination thereof. In some cases, one or more of the first, second, and third steels comprises about less than 2 wt. % manganese, about 8 wt. % to about 10.5 wt. % nickel, about 18 wt. % to about 20 wt. % chromium, or a combination thereof. As noted above, in some cases, the first, second, and/or the third steels are in the form of containers. Preferably, each of the first, second, and/or the third steels are in the form of containers. In at least one embodiment, the first, second, and third steels are 304 stainless steel containers.

According to another non-limiting embodiment, provided is a method for producing EVOH copolymer compositions, which is similar to the above non-limiting embodiment of a method except that the third solution also contains a manganese content and may have a broader range of pH values. For instance, the third solution may have a manganese content of about 5 ppm to about 40 ppm, about 10 ppm to about 35 ppm, about 15 ppm to about 30 ppm, or about 20 ppm to about 28 ppm, based on the total weight of the third solution. In at least one case, the third solution has a manganese content of about 25 ppm, based on the total weight of the third solution. The third solution according to this non-limiting embodiment may have a pH that may be above 7.7. For instance, the third solution may have a pH of about 12 or less, about 11 or less, about 10 or less, about 9 or less, about 8 or less, about 7 or less, about 6 or less, about 5 or less, etc. In some cases, the pH of the third solution for this non-limiting embodiment may be about 2 to about 12, about 2 to about 11, or about 3.3 to about 10.9. When the third solution further comprising the manganese, the third solution may have a pH value of about 2 to about 12, about 2 to about 11, or about 3.3 to about 10.9.

EXAMPLES

The following non-limiting examples of aspects of the invention are provided primarily for the purpose of elucidating aspects of the invention and the benefits derived therefrom.

Preparation Example 1

Ethylene-vinyl alcohol ("EVOH") copolymer composition and pellets thereof were produced according to the exemplary methods described below. Specifically, fourteen exemplary EVOH copolymer compositions ("Example EVOHs 1 to 14") and pellets thereof as well as seventeen comparative EVOH copolymer compositions ("Comparative Example EVOHs 1 to 17") and pellets thereof were produced according to the methods discussed below.

Example EVOH 1

Ethylene-vinyl acetate ("EVA") copolymer was produced by polymerizing ethylene monomers and vinyl acetate monomers. The EVA copolymer underwent saponification by 99.5 mole % to produce an EVOH copolymer. The EVOH copolymer used in Example EVOH 1 had an ethylene content of 32 mole %.

Subsequently, the EVOH copolymer was dissolved into a solution comprising methanol and water in a weight ratio of 60:40. The solution was maintained at a temperature of 60° C. for one hour to promote the EVOH copolymer dissolving into the solution of methanol and water. After dissolving the EVOH copolymer into the solution of methanol and water, the solution had a 41 wt. % solid content of the EVOH copolymer.

The solution of methanol, water, and the EVOH copolymer was subsequently pelletized using underwater pelletization. Specifically, the solution of methanol, water, and the EVOH copolymer was pumped into a feeding tube with a flow rate of 120 L/min. The solution was transferred to an inlet pipe, which had a diameter of 2.8 mm, and then cooled by adding water having a temperature of 1.5° C. While cooling, the EVOH copolymer was cut by a rotating knife at a speed of 1,500 rpm to produce EVOH particles.

The EVOH particles were washed with three different solutions separately. First, the EVOH particles were immersed into water in a first 304 stainless steel barrel. Acetic acid and sodium hydroxide were then added to the water to form a first solution having a pH of 11.08. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.5. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 3.4. The EVOH particles remained immersed in the third solution for 600 minutes. The EVOH particles were dried to obtain a final product of EVOH pellets of Example EVOH 1. The final EVOH pellets of Example EVOH 1 had a boron content of 86 ppm.

Example EVOH 2

The EVOH pellets of Example EVOH 2 were produced using a method similar to the method used to produce the EVOH pellets of Example EVOH 1, except for the steps for washing the EVOH particles in Example EVOH 2 were different from the steps for washing the EVOH particles in Example EVOH 1.

In Example EVOH 2, the EVOH particles were washed with three different solutions separately. First, the EVOH particles were immersed into water in a first 304 stainless steel barrel. Acetic acid and sodium hydroxide were then added to the water to form a first solution having a pH of 11.08. The EVOH particles were kept in the first solution for 80 minutes.

Second, the EVOH particles were immersed into water in a second 304 stainless steel barrel. Acetic acid and sodium hydroxide were added into the water to form a second solution having a pH of 3.5. The EVOH particles remained immerse in the second solution for 100 minutes.

Third, the EVOH particles were immersed into water in a third 304 stainless steel barrel. Boron acid, sodium acetate, and sodium hydroxide were added to the water to form a third solution having a pH of 7.61. The EVOH particles remained immersed in the third solution for 540 minutes. The EVOH particles were dried and a final product of EVOH pellets of Example EVOH 2 was produced. The final EVOH pellets of Example EVOH 2 had a boron content of 118 ppm.

Example EVOH 3

The EVOH pellets of Example EVOH 3 were produced using a method similar to the method used to produce the EVOH pellets of Example EVOH 1, except for the steps for washing the EVOH particles in Example EVOH 3 were different from the steps for washing the EVOH particles in Example EVOH 1.

In Example EVOH 3, the EVOH particles were washed with three different solutions separately. First, the EVOH particles were immersed into water in a first 304 stainless steel barrel. Acetic acid and sodium hydroxide were then added to the water to form a first solution having a pH of 10.88. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.42. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 7.58. The EVOH particles remained immersed in the third solution for 600 minutes. The EVOH particles were dried and a final product of EVOH pellets of Example EVOH 3 was produced. The final EVOH pellets of Example EVOH 3 had a boron content of 169 ppm.

Example EVOH 4

The EVOH pellets of Example EVOH 4 were produced using a method similar to the method used to produce the EVOH pellets of Example EVOH 1, except for the steps for washing the EVOH particles in Example EVOH 4 were different from the steps for washing the EVOH particles in Example EVOH 1.

In Example EVOH 4, the EVOH particles were washed with three different solutions separately. First, the EVOH particles were immersed into water in a first 304 stainless steel barrel. Hydrochloric acid and potassium hydroxide were then added to the water to form a first solution having a pH of 11.18. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 3.45. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 3.46. The EVOH particles remained immersed in the third solution for 600 minutes. The EVOH particles were dried and a final product of EVOH pellets of Example EVOH 4 was produced. The final EVOH pellets of Example EVOH 4 had a boron content of 230 ppm.

Example EVOH 5

The EVOH pellets of Example EVOH 5 were produced using a method similar to the method used to produce the EVOH pellets of Example EVOH 1, except for the steps for washing the EVOH particles in Example EVOH 5 were different from the steps for washing the EVOH particles in Example EVOH 1.

In Example EVOH 5, the EVOH particles were washed with three different solutions separately. First, the EVOH particles were immersed into water in a first 304 stainless steel barrel. Hydrochloric acid and potassium hydroxide were then added to the water to form a first solution having a pH of 3.41. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 11.02. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 7.01. The EVOH particles remained immersed in the third solution for 600 minutes. The EVOH particles were dried and a final product of EVOH pellets of Example EVOH 5 was produced. The final EVOH pellets of Example EVOH 5 had a boron content of 53 ppm.

Example EVOH 6

The EVOH pellets of Example EVOH 6 were produced using a method similar to the method used to produce the EVOH pellets of Example EVOH 1, except for the ethylene content of EVOH copolymer and the steps for washing the EVOH particles in Example EVOH 6 were different from Example EVOH 1. The ethylene content of the EVOH copolymer for Example EVOH 6 was 29 mole %.

In Example EVOH 6, the EVOH particles were washed with three different solutions separately. First, the EVOH particles were immersed into water in a first 304 stainless steel barrel. Acetic acid and potassium hydroxide were then added to the water to form a first solution having a pH of 11.2. The EVOH particles were kept in the first solution for 120 minutes.

Second, the EVOH particles were immersed into water in a second 304 stainless steel barrel. Acetic acid and potassium hydroxide were added into the water to form a second solution having a pH of 3.56. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 3.57. The EVOH particles remained immersed in the third solution for 600 minutes. The EVOH particles were dried and a final product of EVOH pellets of Example EVOH 6 was produced. The final EVOH pellets of Example EVOH 6 had a boron content of 128 ppm.

Example EVOH 7

The EVOH pellets of Example EVOH 7 were produced using a method similar to the method used to produce the EVOH pellets of Example EVOH 1, except for the ethylene content of EVOH copolymer and the steps for washing the EVOH particles in Example EVOH 7 were different from Example EVOH 1. The ethylene content of EVOH copolymer for Example EVOH 7 was 29 mole %.

In Example EVOH 7, the EVOH particles were washed with three different solutions separately. First, the EVOH particles were immersed into water in a first 304 stainless steel barrel. Acetic acid and potassium hydroxide were then added to the water to form a first solution having a pH of 3.41. The EVOH particles were kept in the first solution for 120 minutes.

Second, the EVOH particles were immersed into water in a second 304 stainless steel barrel. Acetic acid and potassium hydroxide were added into the water to form a second solution having a pH of 11.01. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 6.88. The EVOH particles remained immersed in the third solution for 600 minutes. The EVOH particles were dried and a final product of EVOH pellets of Example EVOH 7 was produced. The final EVOH pellets of Example EVOH 7 had a boron content of 138 ppm.

Example EVOH 8

The EVOH pellets of Example EVOH 8 were produced using a method similar to the method used to produce the EVOH pellets of Example EVOH 1, except for the ethylene content of EVOH copolymer and the steps for washing the EVOH particles in Example EVOH 8 were different from Example EVOH 1. The ethylene content of EVOH copolymer for Example EVOH 8 was 29 mole %.

In Example EVOH 8, the EVOH particles were washed with three different solutions separately. First, the EVOH particles were immersed into water in a first 304 stainless steel barrel. Phosphoric acid and potassium hydroxide were then added to the water to form a first solution having a pH of 10.99. The EVOH particles were kept in the first solution for 120 minutes.

Second, the EVOH particles were immersed into water in a second 304 stainless steel barrel. Phosphoric acid and potassium hydroxide were added into the water to form a second solution having a pH of 3.54. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 3.47. The EVOH particles remained immersed in the third solution for 600 minutes. The EVOH particles were dried and a final product of EVOH pellets of Example EVOH 8 was produced. The final EVOH pellets of Example EVOH 8 had a boron content of 59 ppm.

Example EVOH 9

The EVOH pellets of Example EVOH 9 were produced using a method similar to the method used to produce the EVOH pellets of Example EVOH 1, except for the ethylene content of EVOH copolymer and the steps for washing the EVOH particles in Example EVOH 9 were different from Example EVOH 1. The ethylene content of EVOH copolymer for Example EVOH 9 was 29 mole %.

In Example EVOH 9, the EVOH particles were washed with three different solutions separately. First, the EVOH particles were immersed into water in a first 304 stainless steel barrel. Phosphoric acid and potassium hydroxide were then added to the water to form a first solution having a pH of 3.61. The EVOH particles were kept in the first solution for 120 minutes.

Second, the EVOH particles were immersed into water in a second 304 stainless steel barrel. Phosphoric acid and potassium hydroxide were added into the water to form a second solution having a pH of 11.12. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 6.98. The EVOH particles remained immersed in the third solution for 600 minutes. The EVOH particles were dried and a final product of EVOH pellets of Example EVOH 9 was produced. The final EVOH pellets of Example EVOH 9 had a boron content of 238 ppm.

Example EVOH 10

The EVOH pellets of Example EVOH 10 were produced using a method similar to the method used to produce the EVOH pellets of Example EVOH 1, except for the ethylene content of EVOH copolymer and the steps for washing the EVOH particles in Example EVOH 10 were different from Example EVOH 1. The ethylene content of EVOH copolymer for Example EVOH 10 was 44 mole %.

In Example EVOH 10, the EVOH particles were washed with three different solutions separately. First, the EVOH particles were immersed into water in a first 304 stainless steel barrel. Acetic acid and sodium hydroxide were then added to the water to form a first solution having a pH of 10.85. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.52. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 3.42. The EVOH particles remained immersed in the third solution for 600 minutes. The EVOH particles were dried and a final product of EVOH pellets of Example EVOH 10 was produced. The final EVOH pellets of Example EVOH 10 had a boron content of 158 ppm.

Example EVOH 11

The EVOH pellets of Example EVOH 11 were produced using a method similar to the method used to produce the EVOH pellets of Example EVOH 1, except for the ethylene content of EVOH copolymer and the steps for washing the EVOH particles in Example EVOH 11 were different from Example EVOH 1. The ethylene content of EVOH copolymer for Example EVOH 11 was 44 mole %.

In Example EVOH 11, the EVOH particles were washed with three different solutions separately. First, the EVOH particles were immersed into water in a first 304 stainless steel barrel. Acetic acid and sodium hydroxide were then added to the water to form a first solution having a pH of 10.85. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.54. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 7.22. The EVOH particles remained immersed in the third solution for 600 minutes. The EVOH particles were dried and a final product of EVOH pellets of Example EVOH 11 was produced. The final EVOH pellets of Example EVOH 11 had a boron content of 210 ppm.

Example EVOH 12

The EVOH pellets of Example EVOH 12 were produced using a method similar to the method used to produce the EVOH pellets of Example EVOH 1, except for the ethylene content of EVOH copolymer and the steps for washing the EVOH particles in Example EVOH 12 were different from Example EVOH 1. The ethylene content of EVOH copolymer for Example EVOH 12 was 38 mole %.

In Example EVOH 12, the EVOH particles were washed with three different solutions separately. First, the EVOH particles were immersed into water in a first 304 stainless steel barrel. Acetic acid and sodium hydroxide were then added to the water to form a first solution having a pH of 11.02. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.42. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 3.45. The EVOH particles remained immersed in the third solution for 600 minutes. The EVOH particles were dried and a final product of EVOH pellets of Example EVOH 12 was produced. The final EVOH pellets of Example EVOH 12 had a boron content of 102 ppm.

Example EVOH 13

The EVOH pellets of Example EVOH 13 were produced using a method similar to the method used to produce the EVOH pellets of Example EVOH 1, except for the ethylene content of EVOH copolymer and the steps for washing the EVOH particles in Example EVOH 13 were different from Example EVOH 1. The ethylene content of EVOH copolymer for Example EVOH 13 was 38 mole %.

In Example EVOH 13, the EVOH particles were washed with three different solutions separately. First, the EVOH particles were immersed into water in a first 304 stainless steel barrel. Acetic acid and sodium hydroxide were then added to the water to form a first solution having a pH of 11.02. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.44. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 7.35. The EVOH particles remained immersed in the third solution for 600 minutes. The EVOH particles were dried and a final product of EVOH pellets of Example EVOH 13 was produced. The final EVOH pellets of EVOH 13 had a boron content of 258 ppm.

Example EVOH 14

The EVOH pellets of Example EVOH 14 were produced using a method similar to the method used to produce the EVOH pellets of Example EVOH 1, except for the steps for washing the EVOH particles in Example EVOH 14 were different from the steps for washing the EVOH particles in Example EVOH 1. The ethylene content of EVOH copolymer for Example EVOH 14 was 38 mole %.

In Example EVOH 14, the EVOH particles were washed with three different solutions separately. First, the EVOH particles were immersed into water in a first 304 stainless steel barrel. Acetic acid and sodium hydroxide were then added to the water to form a first solution having a pH of 3.42. The EVOH particles were kept in the first solution for 120 minutes.

Second, the EVOH particles were immersed into water in a second 304 stainless steel barrel. Acetic acid and sodium hydroxide were added into the water to form a second solution having a pH of 10.88. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 3.48. The EVOH particles remained immersed in the third solution for 600 minutes. The EVOH particles were dried and a final product of EVOH pellets of Example EVOH 14 was produced. The final EVOH pellets of Example EVOH 14 had a boron content of 200 ppm.

Comparative Example EVOH 1

The EVOH pellets of Comparative Example EVOH 1 were produced using a method similar to the method used to produce the EVOH pellets of Example EVOH 1, except for the steps for washing the EVOH particles in Comparative Example EVOH 1 were different from the steps for washing the EVOH particles in Example EVOH 1.

In Comparative Example EVOH 1, the EVOH particles were washed with three different solutions separately. First, the EVOH particles were immersed into water in a first 304 stainless steel barrel. Acetic acid and sodium hydroxide were then added to the water to form a first solution having a pH of 3.46. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.46. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 3.5. The EVOH particles remained immersed in the third solution for 600 minutes. The EVOH particles were dried and a final product of EVOH pellets of Comparative Example EVOH 1 was produced. The final EVOH pellets of Comparative Example EVOH 1 had a boron content of 135 ppm.

Comparative Example EVOH 2

The EVOH pellets of Comparative Example EVOH 2 were produced using a method similar to the method used to produce the EVOH pellets of Example EVOH 1, except for the steps for washing the EVOH particles in Comparative Example EVOH 2 were different from the steps for washing the EVOH particles in Example EVOH 1.

In Comparative Example EVOH 2, the EVOH particles were washed with three different solutions separately. First, the EVOH particles were immersed into water in a first 304 stainless steel barrel. Acetic acid and sodium hydroxide were then added to the water to form a first solution having a pH of 3.42. The EVOH particles were kept in the first solution for 100 minutes.

Second, the EVOH particles were immersed into water in a second 304 stainless steel barrel. Acetic acid and sodium hydroxide were added into the water to form a second solution having a pH of 3.41. The EVOH particles remained immerse in the second solution for 100 minutes.

Third, the EVOH particles were immersed into water in a third 304 stainless steel barrel. Boron acid, sodium acetate, and sodium hydroxide were added to the water to form a third solution having a pH of 3.45. The EVOH particles remained immersed in the third solution for 540 minutes. The EVOH particles were dried and a final product of EVOH pellets of Comparative Example EVOH 2 was produced. The final EVOH pellets of Comparative Example EVOH 2 had a boron content of 85 ppm.

Comparative Example EVOH 3

The EVOH pellets of Comparative Example EVOH 3 were produced using a method similar to the method used to produce the EVOH pellets of Example EVOH 1, except for the steps for washing the EVOH particles in Comparative Example EVOH 3 were different from the steps for washing the EVOH particles in Example EVOH 1.

In Comparative Example EVOH 3, the EVOH particles were washed with three different solutions separately. First, the EVOH particles were immersed into water in a first 304 stainless steel barrel. Acetic acid and sodium hydroxide were then added to the water to form a first solution having a pH of 11.08. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.5. The EVOH particles remained immerse in the second solution for 120 minutes.

Third, the EVOH particles were immersed into water in a third 304 stainless steel barrel. Boron acid, sodium acetate and sodium hydroxide were added to the water to form a third solution having a pH of 10.9. The EVOH particles 3 remained immersed in the third solution for 600 minutes. The EVOH particles were dried and a final product of EVOH pellets of Comparative Example EVOH 3 was produced. The final EVOH pellets of Comparative Example EVOH 3 had a boron content of 158 ppm.

Comparative Example EVOH 4

The EVOH pellets of Comparative Example EVOH 4 were produced using a method similar to the method used to produce the EVOH pellets of Example EVOH 1, except for the steps for washing the EVOH particles in Comparative Example EVOH 4 were different from the steps for washing the EVOH particles in Example EVOH 1.

In Comparative Example EVOH 4, the EVOH particles were washed with three different solutions separately. First, the EVOH particles were immersed into water in a first 304 stainless steel barrel. Acetic acid and sodium hydroxide were then added to the water to form a first solution having a pH of 3.6. The EVOH particles were kept in the first solution for 120 minutes.

Second, the EVOH particles were immersed into water in a second 304 stainless steel barrel. Acetic acid and sodium hydroxide were added into the water to form a second solution having a pH of 11.23. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 10.84. The EVOH particles remained immersed in the third solution for 600 minutes. The EVOH particles were dried and a final product of EVOH pellets of Comparative Example EVOH 4 was produced. The final EVOH pellets of Comparative Example EVOH 4 had a boron content of 289 ppm.

Comparative Example EVOH 5

The EVOH pellets of Comparative Example EVOH 5 were produced using a method similar to the method used to produce the EVOH pellets of Example EVOH 1, except for the steps for washing the EVOH particles in Comparative Example EVOH 5 were different from the steps for washing the EVOH particles in Example EVOH 1.

In Comparative Example EVOH 5, the EVOH particles were washed with three different solutions separately. First, the EVOH particles were immersed into water in a first 304 stainless steel barrel. Acetic acid and sodium hydroxide were then added to the water to form a first solution having a pH of 11.08. The EVOH particles were kept in the first solution for 120 minutes.

Second, the EVOH particles were immersed into water in a second 304 stainless steel barrel. Acetic acid and sodium hydroxide were added into the water to form a second solution having a pH of 10.97. The EVOH particles remained immerse in the second solution for 120 minutes.

Third, the EVOH particles were immersed into water in a third 304 stainless steel barrel. Boron acid, sodium acetate and sodium hydroxide were added to the water to form a third solution having a pH of 11.32. The EVOH particles remained immersed in the third solution for 600 minutes. The EVOH particles were dried and a final product of EVOH pellets of Comparative Example EVOH 5 was produced. The final EVOH pellets of Comparative Example EVOH 5 had a boron content of 159 ppm.

Comparative Example EVOH 6

The EVOH pellets of Comparative Example EVOH 6 were produced using a method similar to the method used to produce the EVOH pellets of Example EVOH 1, except for the steps for washing the EVOH particles in Comparative Example EVOH 6 were different from the steps for washing the EVOH particles in Example EVOH 1.

In Comparative Example EVOH 6, the EVOH particles were washed with three different solutions separately. First, the EVOH particles were immersed into water in a first 304 stainless steel barrel. Hydrochloric acid and potassium hydroxide were then added to the water to form a first solution having a pH of 3.51. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 3.51. The EVOH particles remained immerse in the second solution for 120 minutes.

Third, the EVOH particles were immersed into water in a third 304 stainless steel barrel. Boron acid, sodium acetate and potassium hydroxide were added to the water to form a third solution having a pH of 3.51. The EVOH particles remained immersed in the third solution for 600 minutes. The EVOH particles were dried and a final product of EVOH pellets of Comparative Example EVOH 6 was produced. The final EVOH pellets of Comparative Example EVOH 6 had a boron content of 119 ppm.

Comparative Example EVOH 7

The EVOH pellets of Comparative Example EVOH 7 were produced using a method similar to the method used to produce the EVOH pellets of Example EVOH 1, except for the steps for washing the EVOH particles in Comparative Example EVOH 7 were different from the steps for washing the EVOH particles in Example EVOH 1.

In Comparative Example EVOH 7, the EVOH particles were washed with three different solutions separately. First, the EVOH particles were immersed into water in a first 304 stainless steel barrel. Hydrochloric acid and potassium hydroxide were then added to the water to form a first solution having a pH of 3.56. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 11.01. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 10.98. The EVOH particles remained immersed in the third solution for 600 minutes. The EVOH particles were dried and a final product of EVOH pellets of Comparative Example EVOH 7 was produced. The final EVOH pellets of Comparative Example EVOH 7 had a boron content of 127 ppm.

Comparative Example EVOH 8

The EVOH pellets of Comparative Example EVOH 8 were produced using a method similar to the method used to produce the EVOH pellets of Example EVOH 1, except for the steps for washing the EVOH particles in Comparative Example EVOH 8 were different from the steps for washing the EVOH particles in Example EVOH 1.

In Comparative Example EVOH 8, the EVOH particles were washed with three different solutions separately. First, the EVOH particles were immersed into water in a first 304 stainless steel barrel. Hydrochloric acid and potassium hydroxide were then added to the water to form a first solution having a pH of 11.18. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 11. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 11.3. The EVOH particles remained immersed in the third solution for 600 minutes. The EVOH particles were dried and a final product of EVOH pellets of Comparative Example EVOH 8 was produced. The final EVOH pellets of Comparative Example EVOH 8 had a boron content of 68 ppm.

Comparative Example EVOH 9

The EVOH pellets of Comparative Example EVOH 9 were produced using a method similar to the method used to produce the EVOH pellets of Example EVOH 1, except for the ethylene content of EVOH copolymer and the steps for washing the EVOH particles in Comparative Example EVOH 9 were different from Example EVOH 1. The ethylene content of EVOH copolymer for Comparative Example EVOH 9 was 29 mole %.

In Comparative Example EVOH 9, the EVOH particles were washed with three different solutions separately. First, the EVOH particles were immersed into water in a first 304 stainless steel barrel. Acetic acid and sodium hydroxide were then added to the water to form a first solution having a pH of 3.44. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.52. The EVOH particles remained immerse in the second solution for 120 minutes.

Third, the EVOH particles were immersed into water in a third 304 stainless steel barrel. Boron acid, sodium acetate and sodium hydroxide were added to the water to form a third solution having a pH of 3.46. The EVOH particles remained immersed in the third solution for 600 minutes. The EVOH particles were dried and a final product of EVOH pellets of Comparative Example EVOH 9 was produced. The final EVOH pellets of Comparative Example EVOH 9 had a boron content of 258 ppm.

Comparative Example EVOH 10

The EVOH pellets of Comparative Example EVOH 10 were produced using a method similar to the method used to produce the EVOH pellets of Example EVOH 1, except for the ethylene content of EVOH copolymer and the steps for washing the EVOH particles in Comparative Example EVOH 10 were different from Example EVOH 1. The ethylene content of EVOH copolymer for Comparative Example EVOH 10 was 29 mole %.

In Comparative Example EVOH 10, the EVOH particles were washed with three different solutions separately. First, the EVOH particles were immersed into water in a first 304 stainless steel barrel. Acetic acid and sodium hydroxide were then added to the water to form a first solution having a pH of 3.45. The EVOH particles were kept in the first solution for 120 minutes.

Second, the EVOH particles were immersed into water in a second 304 stainless steel barrel. Acetic acid and sodium hydroxide were added into the water to form a second solution having a pH of 11. The EVOH particles remained immerse in the second solution for 120 minutes.

Third, the EVOH particles were immersed into water in a third 304 stainless steel barrel. Boron acid, sodium acetate and sodium hydroxide were added to the water to form a third solution having a pH of 11.12. The EVOH particles remained immersed in the third solution for 600 minutes. The EVOH particles were dried and a final product of EVOH pellets of Comparative Example EVOH 10 was produced. The final EVOH pellets of Comparative Example EVOH 10 had a boron content of 68 ppm.

Comparative Example EVOH 11

The EVOH pellets of Comparative Example EVOH 11 were produced using a method similar to the method used to produce the EVOH pellets of Example EVOH 1, except for the ethylene content of EVOH copolymer and the steps for washing the EVOH particles in Comparative Example EVOH 11 were different from Example EVOH 1. The ethylene content of EVOH copolymer for Comparative Example EVOH 11 was 29 mole %.

In Comparative Example EVOH 11, the EVOH particles were washed with three different solutions separately. First, the EVOH particles were immersed into water in a first 304 stainless steel barrel. Acetic acid and sodium hydroxide were then added to the water to form a first solution having a pH of 11.05. The EVOH particles were kept in the first solution for 120 minutes.

Second, the EVOH particles were immersed into water in a second 304 stainless steel barrel. Acetic acid and sodium hydroxide were added into the water to form a second solution having a pH of 10.98. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 11.12. The EVOH particles remained immersed in the third solution for 600 minutes. The EVOH particles were dried and a final product of EVOH pellets of Comparative Example EVOH 11 was produced. The final EVOH pellets of Comparative Example EVOH 11 had a boron content of 210 ppm.

Comparative Example EVOH 12

The EVOH pellets of Comparative Example EVOH 12 were produced using a method similar to the method used to produce the EVOH pellets of Example EVOH 1, except for the ethylene content of EVOH copolymer and the steps for washing the EVOH particles in Comparative Example EVOH 12 were different from Example EVOH 1. The ethylene content of EVOH copolymer for Comparative Example EVOH 12 was 29 mole %.

In Comparative Example EVOH 12, the EVOH particles were washed with three different solutions separately. First, the EVOH particles were immersed into water in a first 304 stainless steel barrel. Phosphoric acid and potassium hydroxide were then added to the water to form a first solution having a pH of 3.62. The EVOH particles were kept in the first solution for 120 minutes.

Second, the EVOH particles were immersed into water in a second 304 stainless steel barrel. Phosphoric acid and potassium hydroxide were added into the water to form a second solution having a pH of 3.5. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 3.58. The EVOH particles remained immersed in the third solution for 600 minutes. The EVOH particles were dried and a final product of EVOH pellets of Comparative Example EVOH 12 was produced. The final EVOH pellets of Comparative Example EVOH 12 had a boron content of 115 ppm.

Comparative Example EVOH 13

The EVOH pellets of Comparative Example EVOH 13 were produced using a method similar to the method used to produce the EVOH pellets of Example EVOH 1, except for the ethylene content of EVOH copolymer and the steps for washing the EVOH particles in Comparative Example EVOH 13 were different from Example EVOH 1. The ethylene content of EVOH copolymer for Comparative Example EVOH 13 was 29 mole %.

In Comparative Example EVOH 13, the EVOH particles were washed with three different solutions separately. First, the EVOH particles were immersed into water in a first 304 stainless steel barrel. Phosphoric acid and potassium hydroxide were then added to the water to form a first solution having a pH of 3.46. The EVOH particles were kept in the first solution for 120 minutes.

Second, the EVOH particles were immersed into water in a second 304 stainless steel barrel. Phosphoric acid and potassium hydroxide were added into the water to form a second solution having a pH of 11.21. The EVOH particles remained immerse in the second solution for 120 minutes.

Third, the EVOH particles were immersed into water in a third 304 stainless steel barrel. Boron acid, sodium acetate and potassium hydroxide were added to the water to form a third solution having a pH of 10.92. The EVOH particles remained immersed in the third solution for 600 minutes. The EVOH particles were dried and a final product of EVOH pellets of Comparative Example EVOH 13 was produced. The final EVOH pellets of Comparative Example EVOH 13 had a boron content of 123 ppm.

Comparative Example EVOH 14

The EVOH pellets of Comparative Example EVOH 14 were produced using a method similar to the method used to produce the EVOH pellets of Example EVOH 1, except for the ethylene content of EVOH copolymer and the steps for washing the EVOH particles in Comparative Example EVOH 14 were different from Example EVOH 1. The ethylene content of EVOH copolymer for Comparative Example EVOH 14 was 29 mole %.

In Comparative Example EVOH 14, the EVOH particles were washed with three different solutions separately. First, the EVOH particles were immersed into water in a first 304 stainless steel barrel. Phosphoric acid and potassium hydroxide were then added to the water to form a first solution having a pH of 11.07. The EVOH particles were kept in the first solution for 120 minutes.

Second, the EVOH particles were immersed into water in a second 304 stainless steel barrel. Phosphoric acid and potassium hydroxide were added into the water to form a second solution having a pH of 11.08. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 11.2. The EVOH particles remained immersed in the third solution for 600 minutes. The EVOH particles were dried and a final product of EVOH pellets of Comparative Example EVOH 14 was produced. The final EVOH pellets of Comparative Example EVOH 14 had a boron content of 208 ppm.

Comparative Example EVOH 15

The EVOH pellets of Comparative Example EVOH 15 were produced using a method similar to the method used to produce the EVOH pellets of Example EVOH 1, except for the steps for washing the EVOH particles in Comparative Example EVOH 15 were different from the steps for washing the EVOH particles in Example EVOH 1. The ethylene content of EVOH copolymer for Comparative Example EVOH 15 was 32 mole %.

In Comparative Example EVOH 15, the EVOH particles were washed with three different solutions separately. First, the EVOH particles were immersed into water in a first 304 stainless steel barrel. Hydrochloric acid and potassium hydroxide were then added to the water to form a first solution having a pH of 11.18. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 2.51. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 2.51. The EVOH particles remained immersed in the third solution for 600 minutes. The EVOH particles were dried and a final product of EVOH pellets of Comparative Example EVOH 15 was produced. The final EVOH pellets of Comparative Example EVOH 15 had a boron content of 230 ppm.

Comparative Example EVOH 16

The EVOH pellets of Comparative Example EVOH 16 were produced using a method similar to the method used to produce the EVOH pellets of Example EVOH 1, except for the ethylene content of EVOH copolymer and the steps for washing the EVOH particles in Comparative Example EVOH 16 were different from Example EVOH 1. The ethylene content of EVOH copolymer for Comparative Example EVOH 16 was 29 mole %.

In Comparative Example EVOH 16, the EVOH particles were washed with three different solutions separately. First, the EVOH particles were immersed into water in a first 304 stainless steel barrel. Acetic acid and potassium hydroxide were then added to the water to form a first solution having a pH of 3.41. The EVOH particles were kept in the first solution for 120 minutes.

Second, the EVOH particles were immersed into water in a second 304 stainless steel barrel. Acetic acid and potassium hydroxide were added into the water to form a second solution having a pH of 12.01. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 6.88. The EVOH particles remained immersed in the third solution for 600 minutes. The EVOH particles were dried and a final product of EVOH pellets of Comparative Example EVOH 16 was produced. The final EVOH pellets of Comparative Example EVOH 16 had a boron content of 189 ppm.

Comparative Example EVOH 17

The EVOH pellets of Comparative Example EVOH 17 were produced using a method similar to the method used to produce the EVOH pellets of Example EVOH 1, except for the ethylene content of EVOH copolymer and the steps for washing the EVOH particles in Comparative Example EVOH 17 were different from Example EVOH 1. The ethylene content of EVOH copolymer for Comparative Example EVOH 17 was 29 mole %.

In Comparative Example EVOH 17, the EVOH particles were washed with three different solutions separately. First, the EVOH particles were immersed into water in a first 304 stainless steel barrel. Hydrochloric acid and potassium hydroxide were then added to the water to form a first solution having a pH of 11.8. The EVOH particles were kept in the first solution for 120 minutes.

Second, the EVOH particles were immersed into water in a second 304 stainless steel barrel. Hydrochloric acid and potassium hydroxide were added into the water to form a second solution having a pH of 4.5. The EVOH particles remained immerse in the second solution for 120 minutes.

Third, the EVOH particles were immersed into water in a third 304 stainless steel barrel. Boron acid, sodium acetate, and potassium hydroxide were added to the water to form a third solution having a pH of 4.5. The EVOH particles remained immersed in the third solution for 600 minutes. The EVOH particles were dried and a final product of EVOH pellets of Comparative Example EVOH 17 was produced. The final EVOH pellets of Comparative Example EVOH 16 had a boron content of 200 ppm.

Preparation Example 2

Two exemplary EVOH copolymer compositions ("Example EVOHs 15 and 16") and pellets thereof as well as three comparative EVOH copolymer compositions ("Comparative Example EVOHs 18-20") and pellets thereof were produced according to the following methods.

Example EVOH 15

Ethylene-vinyl acetate copolymer was produced by polymerizing ethylene monomers and vinyl acetate monomers. The ethylene-vinyl acetate copolymer underwent saponification by 99.5 mole % to produce an EVOH copolymer. The EVOH copolymer used in Example EVOH 15 had an ethylene content of 32 mole %.

Subsequently, the EVOH copolymer was dissolved into a solution comprising methanol and water in a weight ratio of 60:40. The solution was maintained at a temperature of 60° C. for one hour to promote the EVOH copolymer dissolving into the solution of methanol and water. After dissolving the EVOH copolymer into the solution of methanol and water, the solution had a 41 wt. % solid content of the EVOH copolymer.

The solution of methanol, water, and the EVOH copolymer was subsequently pelletized using underwater pelletization. Specifically, the solution of methanol, water, and the EVOH copolymer was pumped into a feeding tube with a flow rate of 120 L/min. The solution was transferred to an inlet pipe, which had a diameter of 2.8 mm, and then cooled by adding water having a temperature of 1.5° C. While cooling, the EVOH copolymer was cut by a rotating knife at a speed of 1,500 rpm to produce EVOH particles.

The EVOH particles were washed with three different solutions separately. First, the EVOH particles were immersed into water in a first 304 stainless steel barrel. Acetic acid and sodium hydroxide were then added to the water to form a first solution having a pH of 11.08. The EVOH particles were kept in the first solution for 120 minutes.

Second, the EVOH particles were immersed into water in a second 304 stainless steel barrel. Acetic acid and sodium hydroxide were added into the water to form a second solution having a pH of 3.5. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 10.9. Manganese acetate was added to the third solution such that the third solution had a 25 ppm, relative to the third solution, of manganese acetate. The EVOH particles remained immersed in the third solution for 600 minutes. The EVOH particles were dried to obtain a final product of EVOH pellets of Example EVOH 15. The final EVOH pellets of Example EVOH 15 had a boron content of 148 ppm.

Example EVOH 16

The EVOH pellets of Example EVOH 16 were produced using a method similar to the method used in Example EVOH 15, except for the amount of manganese acetate added to the third solution produced a concentration of 10 ppm of manganese acetate relative to the third solution. The final EVOH pellets of Example EVOH 16 had a boron content of 150 ppm.

Comparative Example EVOH 18

The EVOH pellets of Comparative Example EVOH 18 were produced using a method similar to the method used to produce the EVOH pellets of Example EVOH 15, except that manganese acetate was not added to the third solution, such that the third solution had a manganese acetate concentration of 0 ppm. The final EVOH pellets of Comparative Example EVOH 18 had a boron content of 150 ppm.

Comparative Example EVOH 19

The EVOH pellets of Comparative Example EVOH 19 were produced using a method similar to the method used to produce the EVOH pellets of Example EVOH 15, except that the amount of manganese acetate added to the third solution produced a concentration of 50 ppm relative to the third solution. The final EVOH pellets of Comparative Example EVOH 19 had a boron content of 139 ppm.

Comparative Example EVOH 20

The EVOH pellets of Comparative Example EVOH 20 were produced using a method similar to the method used to produce the EVOH pellets of Example EVOH 15, except for the ethylene content of the EVOH copolymer, the manganese acetate concentration, and the steps for washing the EVOH particles in Comparative Example EVOH 20 were different from those in Example EVOH 15. The ethylene content of EVOH copolymer for Comparative Example EVOH 20 was 29 mole %.

In Comparative Example EVOH 20, the EVOH particles were washed with three different solutions separately. First, the EVOH particles were immersed into water in a first 304 stainless steel barrel. Acetic acid and sodium hydroxide were then added to the water to form a first solution having a pH of 3.45. The EVOH particles were kept in the first solution for 120 minutes.

Second, the EVOH particles were immersed into water in a second 304 stainless steel barrel. Acetic acid and sodium hydroxide were added into the water to form a second solution having a pH of 11. The EVOH particles remained immerse in the second solution for 120 minutes.

Third, the EVOH particles were immersed into water in a third 304 stainless steel barrel. Boron acid, sodium acetate, and sodium hydroxide were added to the water to form a third solution having a pH of 11.12. Manganese acetate was added to the third solution such that the third solution had a 25 ppm, relative to the third solution, of manganese acetate. The EVOH particles remained immersed in the third solution for 600 minutes. The EVOH particles were dried and a final product of EVOH pellets of Comparative Example EVOH 20 was produced. The final EVOH pellets of Comparative Example EVOH 20 had a boron content of 50 ppm.

Test Example 1

The EVOH pellets of Example EVOHs 1 to 16 and Comparative Example EVOHs 1 to 20 were evaluated to determine certain properties of such pellets. In particular, the boron content, the manganese content, the solubility, the pH, and the alkali metal content were evaluated for the pellets of Example EVOHs 1 to 16 and Comparative Example EVOHs 1 to 20.

To evaluate the boron content and the manganese content, a sample solution was prepared by pellets for each of Example EVOHs 1 to 16 and Comparative Example EVOHs 1 to 20 by breaking down 0.2 g of the respective pellets in concentrated 10 ml nitric acid in conjunction with heating from a microwave. The resulting sample solution was then diluted with pure water to 50 ml. The boron and manganese amount contained in the prepared solution was measured using Inductively Coupled Plasma (ICP) optical emission spectrochemical analysis (ICP-OES). The specific device used for ICP optical emission spectrochemical analysis was a ThermoFisher iCAP7000 device, produced by THERMOFISHER SCIENTIFIC. The boron and manganese amount as a measurement value corresponds to the amount of boron and manganese derived from the boron and manganese compounds incorporated into the respective EVOH pellets for each of Example EVOHs 1 to 16 and Comparative Example EVOHs 1 to 20.

To evaluate the solubility and pH of the pellets of Example EVOHs 1 to 6 and Comparative Example EVOHs 1 to 20, an amount of 2.5 g of pellets for each of Example EVOHs 1 to 16 and Comparative Example EVOHs 1 to 20 was mixed with a solution of 84 g of a methanol aqueous solution. If the pellets had an EVOH copolymer with an ethylene content of 24 mole % to 35 mole %, then the methanol aqueous solution contained 60 wt. % of methanol and 40 wt. % of water. If the pellets had an EVOH copolymer with an ethylene content of 36 mole % to 48 mole %, then the methanol aqueous solution contained 80 wt. % of methanol and 20 wt. % of water. The mixture of EVOH pellets and methanol aqueous solution was then heated to and maintained at a temperature of 250° C. to reflux the solution for 2 hours. After reflux, the temperature of the methanol aqueous solution was decreased to a temperature of 65° C. If the EVOH pellets of any Example EVOH or Comparative Example EVOH dissolved in the methanol aqueous solution during reflux and the solution remained clear and transparent when the temperature was decreased to 65° C., the EVOH pellets of the Example EVOH or Comparative Example EVOH was classified as having good solubility. To obtain an accurate pH reading, methanol solutions having different methanol concentrations were used so that the EVOH pellets would fully dissolve in the methanol solution. Once the temperature of the methanol aqueous solution was at 65° C., the pH of the methanol aqueous solution was evaluated using a MM43X pH meter with a GST-5841C electrode.

The melting point temperatures of EVOH copolymers were determined using the method of ISO 11357-3-2011 with a DSC Q200 device (The Tzero lid was a TA Instrument T 170607 and the Tzero pan was a TA Instrument T 170620).

The hygroscopicity of EVOH copolymer composition was determined according to the method of ISO 14663-2 Annex A.

The degree of saponification of each EVOH copolymer was determined according to the method of JIS K 6726.

The alkali metal content was also determined for the respective EVOH pellets of Example EVOHs 1 to 16 and Comparative Example EVOHs 1 to 20. In particular, 2 g EVOH was placed into a platinum dish, a few milliliters of sulfuric acid was added, and then the platinum dish having the EVOH and sulfuric acid was heated with a gas burner. After confirming that the EVOH particles were carbonized and the sulfuric acid white smoke disappeared, few drops of sulfuric acid were added and the combination of carbonized particles and sulfuric acid were reheated. This operation was repeated until the organic matter disappeared, and the resulting material was completely ash. The platinum dish was then left to cool, and 1 mL of hydrochloric acid was added to dissolve the ash. The hydrochloric acid solution containing the ash was washed with ultrapure water and then diluted to 50 mL. The alkali metal content in the sample solution was measured with an inductively coupled plasma spectrometer (ICP-AES) (manufactured by Agilent Technology, Model 720-ES). Finally, the alkali metal concentration in the solution was converted into the alkali metal content in the pellets of the EVOH composition.

A summary of the evaluation of the boron content, the manganese content, the pH, and the alkali metal content for the pellets of Example EVOHs 1 to 16 and Comparative Example EVOHs 1 to 20 is provided below in Table 1. The term "ND" indicates that no value was detected for the amount of manganese for such EVOH copolymer composition.

TABLE 1

| | Ethylene Content of EVOH Copolymer (mole %) | Manganese Content (ppm) | pH Value | Boron Content (ppm) | Alkali Metal Content (ppm) |
|---|---|---|---|---|---|
| Ex. EVOH 1 | 32 | 0.49 | 5.13 | 86 | 103 |
| Ex. EVOH 2 | 32 | 0.21 | 6 | 118 | 167 |
| Ex. EVOH 3 | 32 | 0.2 | 6.75 | 169 | 172 |
| Ex. EVOH 4 | 32 | 0.47 | 5.18 | 230 | 125 |
| Ex. EVOH 5 | 32 | 0.01 | 6.22 | 53 | 232 |
| Ex. EVOH 6 | 29 | 0.47 | 5.28 | 128 | 121 |
| Ex. EVOH 7 | 29 | 0.03 | 6.07 | 138 | 215 |
| Ex. EVOH 8 | 29 | 0.4 | 5.23 | 59 | 143 |
| Ex. EVOH 9 | 29 | 0.03 | 6.18 | 238 | 210 |
| Ex. EVOH 10 | 44 | 0.43 | 5.18 | 158 | 142 |
| Ex. EVOH 11 | 44 | 0.23 | 6.68 | 210 | 187 |
| Ex. EVOH 12 | 38 | 0.48 | 5.22 | 102 | 145 |
| Ex. EVOH 13 | 38 | 0.19 | 6.7 | 258 | 163 |
| Ex. EVOH 14 | 38 | 0.39 | 5.29 | 200 | 99 |
| Ex. EVOH 15 | 32 | 0.45 | 7.13 | 148 | 168 |
| Ex. EVOH 16 | 32 | 0.02 | 7.19 | 150 | 162 |
| Comp. Ex. EVOH 1 | 32 | 0.71 | 4.79 | 135 | 53 |
| Comp. Ex. EVOH 2 | 32 | 0.63 | 4.98 | 85 | 59 |
| Comp. Ex. EVOH 3 | 32 | ND | 7.31 | 158 | 257 |
| Comp. Ex. EVOH 4 | 32 | ND | 8.66 | 289 | 329 |
| Comp. Ex. EVOH 5 | 32 | ND | 9.19 | 159 | 386 |
| Comp. Ex. EVOH 6 | 32 | 0.64 | 4.68 | 119 | 53 |
| Comp. Ex. EVOH 7 | 32 | ND | 8.2 | 127 | 324 |
| Comp. Ex. EVOH 8 | 32 | ND | 9.22 | 68 | 388 |
| Comp. Ex. EVOH 9 | 29 | 0.67 | 4.7 | 258 | 53 |
| Comp. Ex. EVOH 10 | 29 | ND | 8.41 | 68 | 347 |
| Comp. Ex. EVOH 11 | 29 | ND | 9.22 | 210 | 392 |
| Comp. Ex. EVOH 12 | 29 | 0.78 | 4.72 | 115 | 57 |
| Comp. Ex. EVOH 13 | 29 | ND | 8.31 | 123 | 348 |
| Comp. Ex. EVOH 14 | 29 | ND | 9.17 | 208 | 372 |
| Comp. Ex. EVOH 15 | 32 | 0.98 | 3.89 | 230 | 110 |
| Comp. Ex. EVOH 16 | 29 | ND | 7.3 | 189 | 213 |
| Comp. Ex. EVOH 17 | 29 | ND | 5.4 | 200 | 143 |
| Comp. Ex. EVOH 18 | 32 | ND | 7.3 | 150 | 173 |
| Comp. Ex. EVOH 19 | 32 | 0.7 | 6.98 | 139 | 165 |
| Comp. Ex. EVOH 20 | 29 | ND | 8.2 | 50 | 332 |

Test Example 2

Mono-layer films of Example EVOHs 1 to 16 and Comparative Example EVOHs 1 to 20 were evaluated to assess the gelation and oxygen transmission rate ("OTR") through the mono-layer films. Specifically, pellets of Example EVOHs 1 to 16 and Comparative Example EVOHs 1 to 20 were fed into a single layer T-die cast film extruder to produce mono-layer films with a thickness of 25 μm for each of Example EVOHs 1 to 16 and Comparative Example EVOHs 1 to 20. The single layer T-die cast film extruder was an ME25/5800V4 extruder, produced by OCS, that was coupled to a FSA100 detector for gel observation.

The OTR for the mono-layer films of Example EVOHs 1 to 16 and Comparative Example EVOHs 1 to 20 was evaluated pursuant to the International Organization for Standardization standard ISO14663-2 and measured under 23° C./65RH using OXTRAN 2/21 device, produced by MOCON. For mono-layer films produced from an EVOH copolymer composition having an EVOH copolymer with an ethylene content of 29 mole % to 32 mole %, the mono-layer film was assessed to have an excellent OTR if less than or equal to 0.4 cc/(m²×24 hr) (marked as "○" in Table 2) and an inferior OTR if greater than 0.4 cc/(m²×24 hr) (marked as "x" in Table 2). For mono-layer films produced from an EVOH copolymer composition having an EVOH copolymer with an ethylene content of 38 mole % to 44 mole %, the mono-layer film was assessed to have an excellent OTR if less than or equal to 2 cc/(m²×24 hr) (marked as "○" in Table 2) and an inferior OTR if greater than 2 cc/(m²×24 hr) (marked as "x" in Table 2).

The gelation of the mono-layer films was assessed using a modular surface inspection system, specifically a FSA 100 detector device. The gelation of the mono-layer films was assessed to determine the number of gel spots having a diameter (e.g., long diameter if the gel spot has an ovular shape) of less than 100 μm for a 1 square meter section of the mono-layer films. If the mono-layer film had less than 100 gel spots with a diameter (e.g., long diameter if ovular) less than 100 μm per the assessed square meter (1/m²) of mono-layer film, then the mono-layer film was classified as having a superior gelation value (marked as "○" in Table 2). If the mono-layer film had between 100 and 500 gel spots with a diameter (e.g., long diameter if ovular) less than 100 μm per the assessed square meter (1/m²), then the mono-layer film was classified as having a sufficient gelation value (marked as "Δ" in Table 2). If the mono-layer film had greater than 500 gel spots with a diameter (e.g., long diameter if ovular) less than 100 μm per the assessed square meter (1/m²), then the mono-layer film was classified as having an inferior gelation value (marked as "x" in Table 2).

Mono-layer films produced from both the Example EVOHs and Comparative Example EVOHs had less than 50 gel spots with a diameter of greater than 100 μm for a 1 square meter section of the respective mono-layer films. For many applications, however, it is suitable for a mono-layer film to have up to 50 gel spots with a diameter of greater than 100 μm per 1 square meter section of the mono-layer film. The number of gel spots with a diameter of less than 100 μm is more common and primarily effects the appearance of the mono-layer film. In addition to having a suitable number of gel spots with a diameter of greater than 100 μm, the mono-layer films of the Example EVOHs advantageously had a desirable number of gel spot with a diameter of less than 100 μm.

A summary of the evaluation of the OTR and gelation for the mono-layer films of Example EVOHs 1 to 16 and Comparative Example EVOHs 1 to 20 is provided below in Table 2.

TABLE 2

|  | OTR | Gel |
| --- | --- | --- |
| Ex. EVOH 1 | ○ | Δ |
| Ex. EVOH 2 | ○ | ○ |
| Ex. EVOH 3 | ○ | ○ |
| Ex. EVOH 4 | ○ | Δ |
| Ex. EVOH 5 | ○ | ○ |
| Ex. EVOH 6 | ○ | Δ |
| Ex. EVOH 7 | ○ | ○ |
| Ex. EVOH 8 | ○ | Δ |
| Ex. EVOH 9 | ○ | ○ |
| Ex. EVOH 10 | ○ | Δ |
| Ex. EVOH 11 | ○ | ○ |
| Ex. EVOH 12 | ○ | Δ |
| Ex. EVOH 13 | ○ | ○ |
| Ex. EVOH 14 | ○ | Δ |
| Ex. EVOH 15 | ○ | Δ |
| Ex. EVOH 16 | ○ | Δ |
| Comp. Ex. EVOH 1 | ○ | x |
| Comp. Ex. EVOH 2 | ○ | x |
| Comp. Ex. EVOH 3 | x | Δ |
| Comp. Ex. EVOH 4 | x | Δ |
| Comp. Ex. EVOH 5 | x | x |
| Comp. Ex. EVOH 6 | ○ | x |
| Comp. Ex. EVOH 7 | x | Δ |
| Comp. Ex. EVOH 8 | x | x |
| Comp. Ex. EVOH 9 | ○ | x |
| Comp. Ex. EVOH 10 | x | Δ |
| Comp. Ex. EVOH 11 | x | x |
| Comp. Ex. EVOH 12 | ○ | x |
| Comp. Ex. EVOH 13 | x | Δ |
| Comp. Ex. EVOH 14 | x | x |
| Comp. Ex. EVOH 15 | ○ | x |
| Comp. Ex. EVOH 16 | x | Δ |
| Comp. Ex. EVOH 17 | x | Δ |
| Comp. Ex. EVOH 18 | x | Δ |
| Comp. Ex. EVOH 19 | ○ | x |
| Comp. Ex. EVOH 20 | x | Δ |

Notably, each of the mono-layer films formed from exemplary ethylene-vinyl alcohol copolymer compositions (Example EVOHs 1 to 16) had superior OTR rates and exhibited either superior or sufficient gelation results. The mono-layer films formed from comparative ethylene-vinyl alcohol copolymer compositions (Comparative Example EVOHs 1 to 20) each exhibited inferior properties for OTR, gelation, or both OTR and gelation. Additionally, none of the mono-layer films formed from Comparative Example EVOHs 1 to 20 exhibited superior gelation.

Furthermore, if the pH value of the particles is in the range of 5.3 to 6.9, the both OTR rates and gelation are both superior. Without being limited to any particular theory, the inventors believe that when both manganese content and pH value are in the desired range, the hydrogen bonding and impurities are controlled to be able to reach both superior OTR rates and gel behaviors.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5, includes specifically 1, 2, 3, 4, and 5, as well as sub ranges such as 2 to 5, 3 to 5, 2 to 3, 2 to 4, 1 to 4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free"

as used herein means that there is less than about 2% of the specific characteristic. All elements or characteristics positively set forth in this disclosure can be negatively excluded from the claims.

The invention claimed is:

1. An ethylene-vinyl alcohol copolymer composition comprising:
   an ethylene-vinyl alcohol copolymer; and
   a manganese content of about 0.01 ppm to 0.49 ppm.

2. The ethylene-vinyl alcohol copolymer composition of claim 1, wherein the ethylene content of the ethylene-vinyl alcohol copolymer is about 24 mole % to about 48 mole %.

3. The ethylene-vinyl alcohol copolymer composition of claim 2, wherein the ethylene content of the ethylene-vinyl alcohol copolymer is about 24 mole % to about 35 mole %.

4. The ethylene-vinyl alcohol copolymer composition of claim 3, wherein a solution comprising 2.5 g of the ethylene-vinyl alcohol copolymer composition dissolved in 84 g of an aqueous methanol solution of 60 wt. % methanol has a pH of 5.1 to 7.2.

5. The ethylene-vinyl alcohol copolymer composition of claim 4, wherein the solution has a pH of 5.3 to 6.9.

6. The ethylene-vinyl alcohol copolymer composition of claim 2, wherein the ethylene content of the ethylene-vinyl alcohol copolymer is about 36 mole % to about 48 mole %.

7. The ethylene-vinyl alcohol copolymer composition of claim 6, wherein a solution comprising 2.5 g of the ethylene-vinyl alcohol copolymer composition dissolved in 84 g of an aqueous methanol solution of 80 wt. % methanol has a pH of 5.1 to 7.2.

8. The ethylene-vinyl alcohol copolymer composition of claim 7, wherein the solution has a pH of 5.3 to 6.9.

9. The ethylene-vinyl alcohol copolymer composition of claim 1 further comprising a boron content of about 50 ppm to 300 ppm.

10. The ethylene-vinyl alcohol copolymer composition of claim 1 further comprising an alkali metal content of about 50 ppm to 400 ppm.

11. The ethylene-vinyl alcohol copolymer composition of claim 1, wherein the ethylene-vinyl alcohol copolymer has a degree of saponification of 99.5 mole % or more.

12. The ethylene-vinyl alcohol copolymer composition of claim 1, wherein the manganese content of ethylene-vinyl alcohol copolymer composition is about 0.01 ppm to 0.38 ppm.

13. The ethylene-vinyl alcohol copolymer composition of claim 1, wherein the melting point temperature of ethylene-vinyl alcohol copolymer is from 150° C. to 200° C.

14. The ethylene-vinyl alcohol copolymer composition of claim 1, wherein the hygroscopicity of ethylene-vinyl alcohol copolymer composition is less than 1 wt. %.

15. An ethylene-vinyl alcohol copolymer composition comprising:
   (a) an ethylene-vinyl alcohol copolymer having an ethylene content of about 24 mole % to about 48 mole %, and a degree of saponification of 99.5 mole % or more;
   (b) a manganese content of about 0.01 ppm to 0.49 ppm;
   (c) a boron content of about 50 ppm to 300 ppm; and
   (d) an alkali metal content of about 50 ppm to 400 ppm.

* * * * *